(12) United States Patent
Jeon et al.

(10) Patent No.: US 8,090,515 B2
(45) Date of Patent: Jan. 3, 2012

(54) METHOD FOR CONTROLLING REGENERATIVE BRAKING IN AN ELECTRIC VEHICLE

(75) Inventors: Gab Bae Jeon, Gunpo-si (KR); Byeong Cheol Yang, Daegu (KR)

(73) Assignee: Hyundai Motor Company, Seoul (KR)

( * ) Notice: Subject to any disclaimer, the term of this patent is extended or adjusted under 35 U.S.C. 154(b) by 1077 days.

(21) Appl. No.: 11/923,827

(22) Filed: Oct. 25, 2007

(65) Prior Publication Data

US 2008/0103670 A1 May 1, 2008

(30) Foreign Application Priority Data

Oct. 26, 2006 (KR) .................... 10-2006-0104296
Oct. 26, 2006 (KR) .................... 10-2006-0104299

(51) Int. Cl.
*B60T 8/64* (2006.01)

(52) U.S. Cl. ............... 701/81; 701/70; 701/78; 701/22; 188/152; 303/122; 303/122.04; 180/65.21; 180/65.265; 180/65.275; 180/65.285; 180/65.51

(58) Field of Classification Search .............. 701/70, 701/78, 81; 188/151 R, 152, 182; 303/121, 303/122, 122.04; 180/65.21, 65.265, 65.275, 180/65.285, 65.51
See application file for complete search history.

(56) References Cited

U.S. PATENT DOCUMENTS

| | | | | |
|---|---|---|---|---|
| 5,632,534 A | * | 5/1997 | Knechtges | 303/152 |
| 6,086,166 A | * | 7/2000 | Fukasawa | 303/152 |
| 6,206,488 B1 | * | 3/2001 | Binder et al. | 303/122.04 |
| 6,213,567 B1 | * | 4/2001 | Zittlau et al. | 303/20 |
| 7,167,783 B2 | * | 1/2007 | Park et al. | 701/22 |
| 7,597,408 B2 | * | 10/2009 | Kim | 303/122.03 |
| 7,673,948 B2 | * | 3/2010 | Otomo | 303/114.1 |

* cited by examiner

*Primary Examiner* — Thomas Black
*Assistant Examiner* — Peter D Nolan
(74) *Attorney, Agent, or Firm* — Morgan, Lewis & Bockius LLP

(57) ABSTRACT

Provided is a method for controlling regenerative braking in an electric vehicle, including operating regenerative braking, checking if a data communication using a control area network (CAN) standard is properly made between a regenerative braking torque controller and a hydraulic pressure braking torque controller, and enabling the regenerative braking torque controller and the hydraulic pressure braking torque controller to maintain regenerative braking torque and hydraulic pressure torque at their respective previous levels or to increase regenerative braking torque and/or hydraulic pressure torque until braking ends, when the data communication fails between the regenerative braking torque controller and the hydraulic pressure braking torque controller.

3 Claims, 7 Drawing Sheets

– Torque changing value on exchanging CAN FAIL –

- Control on Exchanging CAN FAIL -

METHOD FOR CONTROLLING REGENERATIVE BRAKING IN AN ELECTRIC VEHICLE

CROSS-REFERENCES TO RELATED APPLICATIONS

The present application claims priority of Korean Application Serial Number 10-2006-0104296, filed on Oct. 26, 2006, with the Korean Intellectual Property Office, the disclosure of which is fully incorporated herein by reference.

BACKGROUND OF THE INVENTION

1. Field of the Invention

The present invention relates generally to a method for controlling regenerative braking in an electric vehicle, and more particularly to a method for controlling regenerative braking in an electric vehicle in which a braking force does not suffer from a loss when a data communication using a control area network (CAN) standard fails between a regenerative braking torque controller and a hydraulic pressure braking torque controller.

2. Description of the Background Art

An electric vehicle is a vehicle having one or more electric motors for propulsion. In the electric vehicle, electrical energy stored in a battery is used in driving the electric motor. Some or all of electrical energy in return is used to drive wheels of the electric vehicle. The electric motor has the ability to convert kinetic energy back into electricity through regenerative braking as a generator.

There are two types of electric vehicles commonly available: a pure electric vehicle, which converts chemical energy to electrical energy in batteries, and a hybrid electric vehicle (HEV), which converts chemical energy to electrical energy via an internal combustion engine and a generator.

The electric vehicle is hereinafter meant to include whatever vehicles utilizing chemical energy stored in rechargeable battery packs to drive the electric motor which in return drives the wheels of the electric vehicle. That is, the electric vehicle uses electric motors instead of, or in addition to, an internal combustion engine. The electric motor not only drives the wheels of the electric vehicle, but also generates electricity, which is to be stored in the battery during braking action operation. This is known as regenerative braking. Through regenerative braking process, the electric motor generates electricity as well as a braking force during braking action operation. That is, a part of the kinetic energy, which would otherwise be lost to heat during braking action operation, is converted into and stored in the battery as electrical energy for prospective us in future.

From this aspect, regenerative braking in the electric vehicle serves to increase fuel mileage and to reduce harmful exhaust gas.

The braking force, generated through regenerative braking, is applied to the wheels connected to the electric motor. Hence, the electric vehicle is additionally equipped with a hydraulic braking system, which generates the braking force using hydraulic pressure. This is because combination of the regenerative braking system and the hydraulic braking system in the electric vehicle makes vehicle dynamics control guaranteed more effectively.

As shown in FIG. 5, a total torque, obtained when a driver pushes down on the brake pedal during normal breaking, is a sum of the hydraulic pressure breaking torque and the regenerative braking torque. This makes it possible for the hydraulic pressure braking force to compensate for loss of the regenerative braking force when regenerative braking operation fails. The hydraulic pressure braking produces heat by forcing a stationary brake pad against a rotating disc. The regenerative braking force serves to generate electricity when reducing speed of the driving motor, by using the motor as a generator. The generated electricity is stored in the battery.

In a case when the regenerative braking controller fails to cooperate with the hydraulic pressure braking controller to produce the braking force, the driver would feel additional application of braking force, that is, earlier application of braking force, while the regenerative braking system works during braking.

To prevent this phenomenon, data communication has to be established between the regenerative braking controller and the hydraulic pressure braking controller to maintain relationship between the two braking controllers.

However, when the data communication fails between the two braking controllers, the hydraulic pressure braking torque sharply increases and the regenerative braking torque sharply decreases to level "0", as the graph in FIG. 6 indicates. Therefore, on the base of the general concept that the total braking torque is equal to hydraulic braking torque and the regenerative braking torque, the total torque 62 summated by hydraulic braking torque 60 and regenerative braking torque 61 become lower than the previous total braking torque 64 during the data-exchange failure. This phenomenon makes the driver feel a lack of braking force.

To improve this lack of braking force a conventional braking torque control system, as shown in FIG. 7, increases the regenerative braking torque gradually and increases the hydraulic pressure braking torque gradually until braking ends when the data communication fails between the two braking controllers. This prevents the braking force from being reduced, and enables the driver to feel a normal braking force when the driver steps on the brake pedal.

However, gradual reduction in the regenerative braking torque brings about corresponding reduction in generation of electricity, thus making the kinetic energy converted less to electrical energy. Furthermore, it is practically impossible to exactly match increase in the hydraulic pressure braking torque with decrease in the regenerative braking torque without decreasing the total braking torque. This mismatch makes the driver feel loss of the braking force when the driver steps on the brake pedal.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

One preferred aspect of the present invention provides a method to increase a total braking torque by increasing a braking force with increasing regenerative braking torque and/or hydraulic pressure braking torque until braking ends when a data communication using a control area network (CAN) standard fails between a regenerative braking torque controller and a hydraulic pressure braking torque controller.

Another preferred aspect of the present invention is to maintain a total braking torque at a normal level by enabling regenerative braking torque and hydraulic pressure braking torque to be maintained at their respective previous level, i.e. at their respective level immediate prior to the failure of CAN communication until braking ends while a data communication using a control area network (CAN) standard fails between a regenerative braking torque controller and a hydraulic pressure braking torque controller.

According to one embodiment of the present invention, there is provided a method for controlling regenerative braking in an electric vehicle, comprising: operating regenerative braking; checking if a data communication using a control area network (CAN) standard is properly made between a regenerative braking torque controller and a hydraulic pressure braking torque controller; and enabling the regenerative braking torque controller and the hydraulic pressure braking torque controller to gradually increase regenerative braking torque and/or hydraulic pressure braking torque, respectively, until braking ends, while the data communication fails between the regenerative braking torque controller and the hydraulic pressure braking torque controller.

Braking ending means a state that an electric vehicle comes to a stop, or a state that a driver stops stepping on the brake pedal. The regenerative braking torque controller may disable the regenerative braking torque after braking ends, when the data communication using a control area network (CAN) standard fails between the regenerative braking torque controller and the hydraulic pressure braking torque controller.

In an another embodiment of the present invention, there is provided a method for controlling regenerative braking in an electric vehicle, comprising: operating regenerative braking; checking if a data communication using a control area network (CAN) standard is properly made between a regenerative braking torque controller and a hydraulic pressure braking torque controller; and enabling the regenerative braking torque controller and the hydraulic pressure braking torque controller to maintain regenerative braking torque and hydraulic pressure torque, respectively, at their respective previous levels until braking ends, while the data communication fails between the regenerative braking torque controller and the hydraulic pressure braking torque controller.

Furthermore the hydraulic pressure torque controller may increase the hydraulic pressure torque unit when the electric vehicle comes to a stop but electricity generated by the electric motor cannot be stored in excess of a capacity of the battery.

Braking ending means that the electric vehicle comes to a stop, or that the driver stops pushing down on the brake pedal. The regenerative braking torque controller may disable the regenerative braking torque after braking ends, while the data communication using a control area network (CAN) standard fails between the regenerative braking torque controller and the hydraulic pressure braking torque controller.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
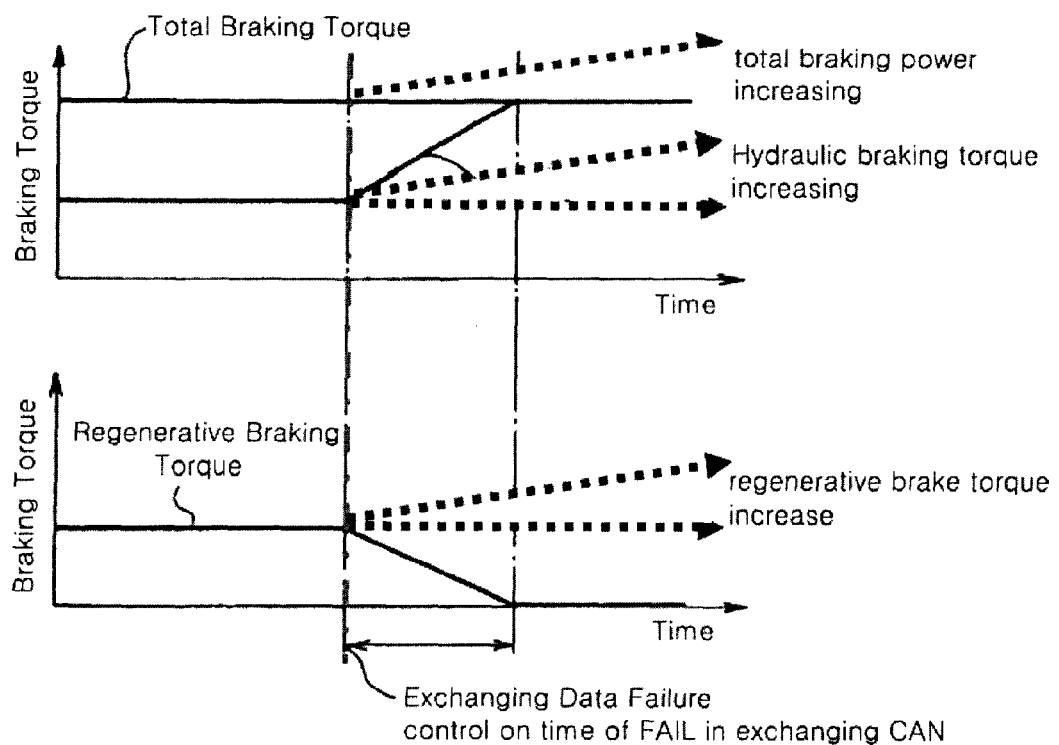
FIG. 1 shows graphs illustrating a first embodiment to increase hydraulic braking torque and/or regenerative brake torque according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Reference will now be made in detail to the preferred embodiment of the present invention, examples of which are illustrated in the accompanying drawings.

In general a braking force is obtained from a sum of the hydraulic pressure torque and the regenerative braking torque, when the driver pushes down on the brake pedal, A data communication using a control area network (CAN) standard is made in real time between the hydraulic pressure braking torque controller and the regenerative braking torque controller.

According to a first embodiment of the present invention, the regenerative braking torque and/or the hydraulic pressure braking torque increases until braking ends, to increase a total braking torque, while the data communication fails between the regenerative braking torque controller and the hydraulic pressure braking torque controller.

FIG. 1 shows graphs illustrating a first embodiment to increase hydraulic braking torque and/or regenerative brake torque according to the present invention.

The braking force is expressed by a sum of the regenerative braking torque and the hydraulic pressure braking torque when the data communication is properly made between the regenerative braking torque controller and the hydraulic pressure braking torque controller during normal regenerative braking. At this point, the regenerative braking torque and the hydraulic pressure braking torque change in real time In FIG. 1. the total braking force of the electrical vehicle is increased by increasing the regenerative braking torque and/or the hydraulic pressure braking torque until braking ends, while the data communication fails between the regenerative braking torque controller and the hydraulic pressure braking torque controller during regenerative braking. Therefore, regenerative braking torque or hydraulic pressure braking torque might be increased respectively, or both regenerative braking torque and hydraulic pressure braking torque might be increased.

That is, the regenerative braking torque controller and the hydraulic pressure braking torque controller gradually increase regenerative braking torque and/or hydraulic pressure braking torque, respectively, thus resulting in increasing the total braking torque.

An increase in the hydraulic pressure braking torque depends on a degree to which the driver pushes down the brake pedal in this case and braking ending means a state that the vehicle comes to a stop, or a state that the driver stops pushing down on the brake pedal.

Figure 2:
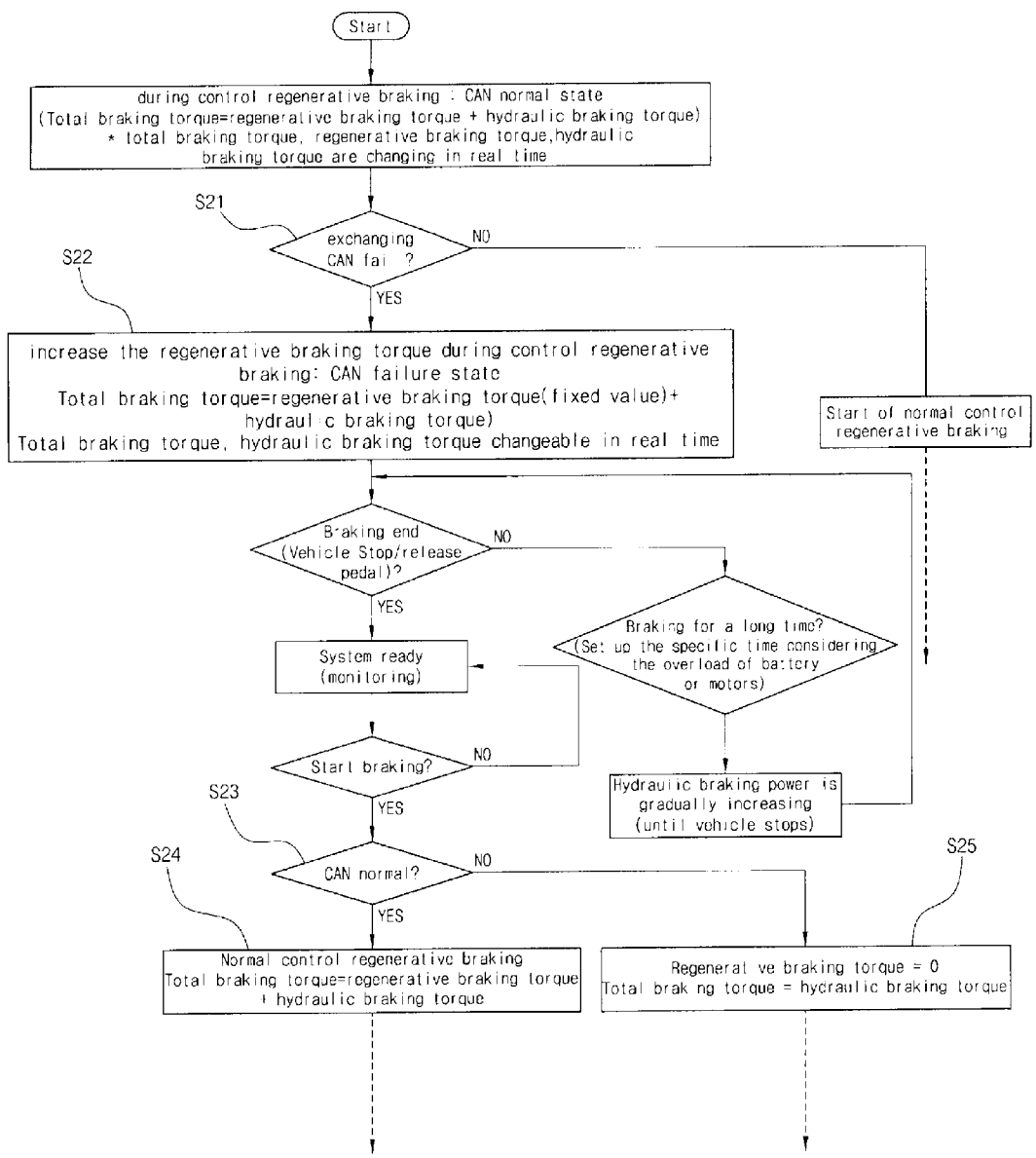
FIG. 2 shows a flow chart illustrating steps for controlling regenerative braking in an electric vehicle according to the first embodiment of the present invention.

FIG. 2 shows a flow chart illustrating steps for controlling regenerative braking in an electric vehicle according to the first embodiment (FIG. 1) of the present invention. From this flowchart a process of checking whether a data communication using a control area network (CAN) standard is properly made between a regenerative braking torque controller and a hydraulic pressure braking torque controller is given at the step of S21. The step S22 shows a stage that enables the regenerative braking torque controller and the hydraulic pressure braking torque controller to gradually increase regenerative braking torque and/or hydraulic pressure braking torque, respectively, until braking ends, while the data communication fails between the regenerative braking torque controller and the hydraulic pressure braking torque controller.

After braking ends, step S23 checks whether CAN is normal. If the data communication is normal between the regenerative braking torque controller and the hydraulic pressure braking torque controller, regenerative braking is enabled again as shown at step S24. However if after braking ends, it s determined that CAN is not normal, only hydraulic pressure braking torque is involved in braking, with the regenerative braking torque not involved in braking at step of S25. That is, the regenerative braking torque controller does not allow the regenerative braking torque to be involved in braking.

Figure 3:
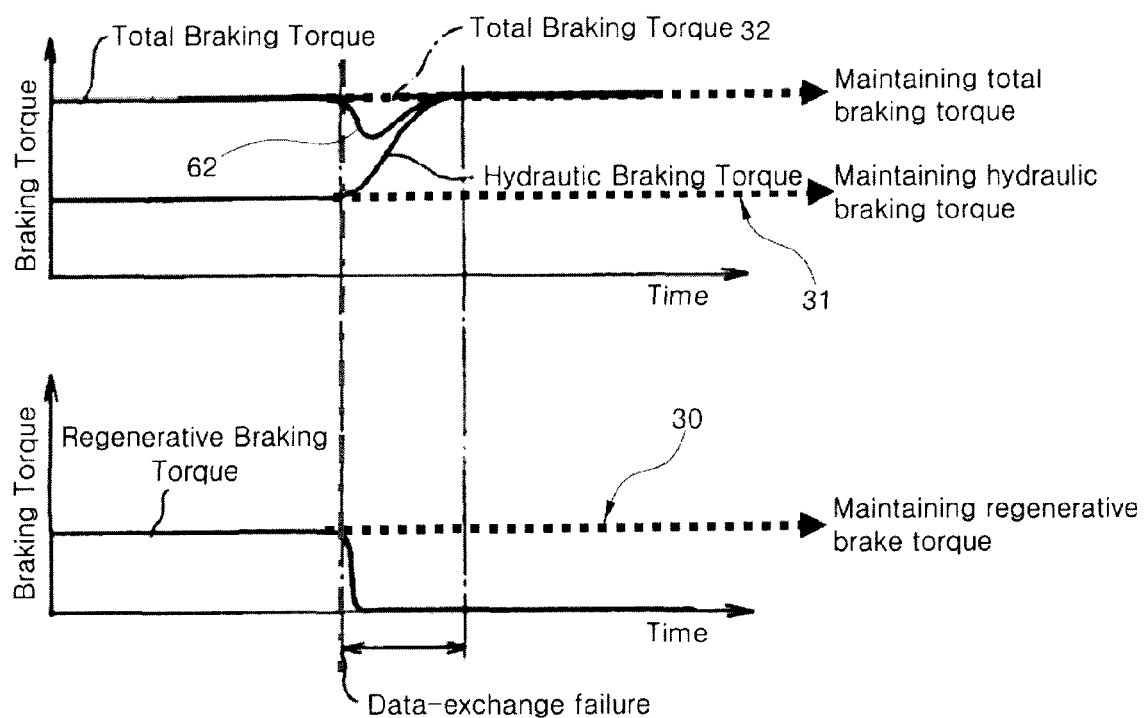
FIG. 3 shows graphs illustrating a second embodiment to maintain the previous values of hydraulic braking torque and/or regenerative brake torque before data-exchange failure according to the present invention.

FIG. 3 shows graphs illustrating a second embodiment to maintain the previous values of hydraulic braking torque and/or regenerative brake torque before data-exchange failure according to the present invention.

In this exemplary second embodiment, the total braking torque 32 is maintained at a previous level (dotted lines) by enabling the regenerative braking torque and the hydraulic pressure braking torque to be maintained to their respective levels 30 and 31 until braking ends, while the data communication fails between the regenerative braking torque controller and the hydraulic pressure braking torque controller during regenerative braking.

Figure 5:
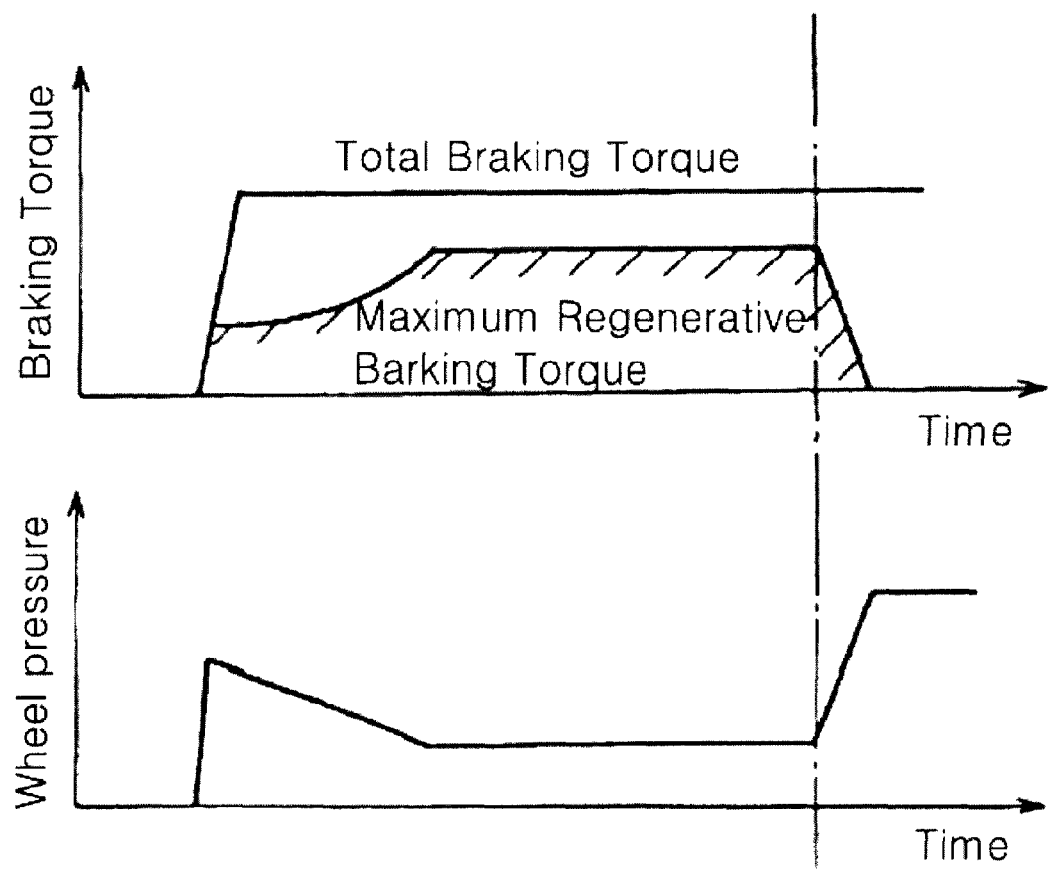
FIG. 5 shows graphs illustrating a general concept to control the hydraulic pressure braking torque and the regenerative braking torque during normal regenerative braking in an electric vehicle.
Figure 6:
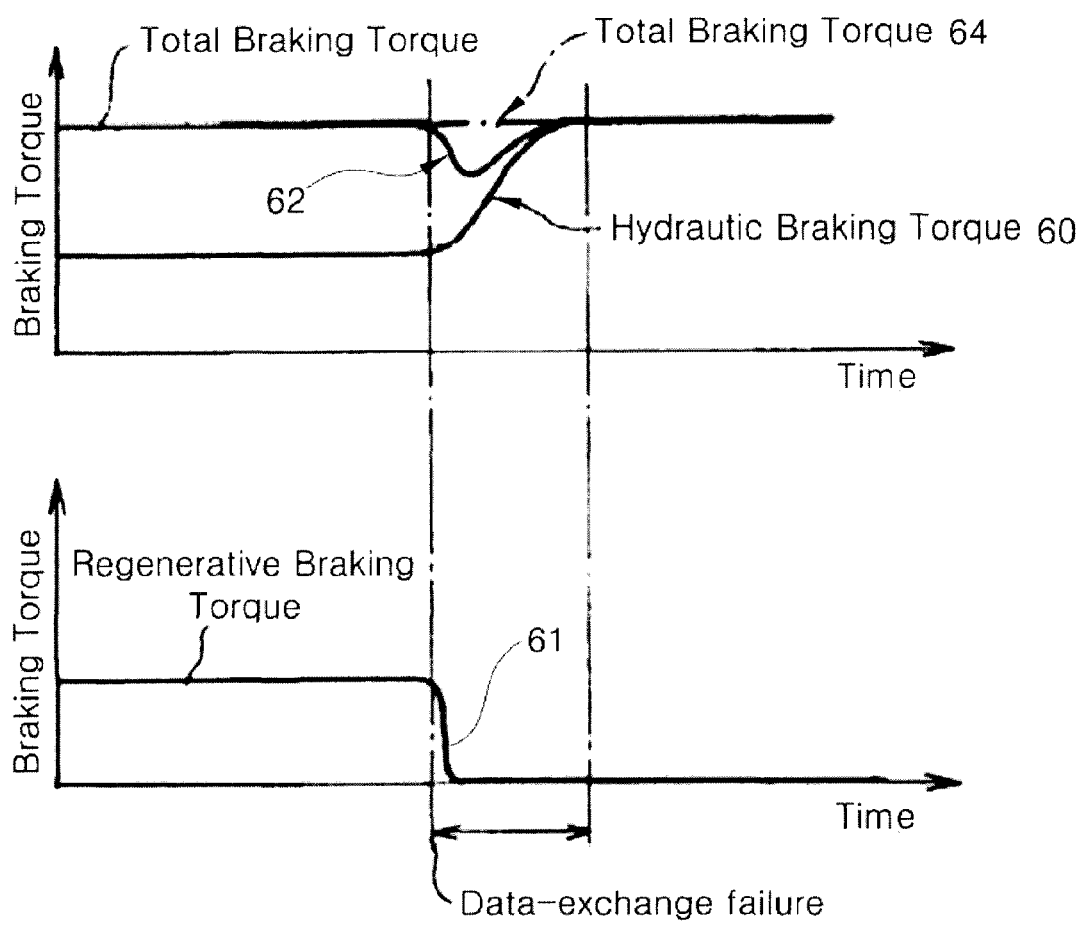
FIG. 6 shows graphs illustrating how the hydraulic pressure braking torque and the regenerative braking torque change when a data communication fails between a regenerative braking torque controller and a hydraulic pressure braking torque controller in the conventional electric vehicle.
Figure 7:
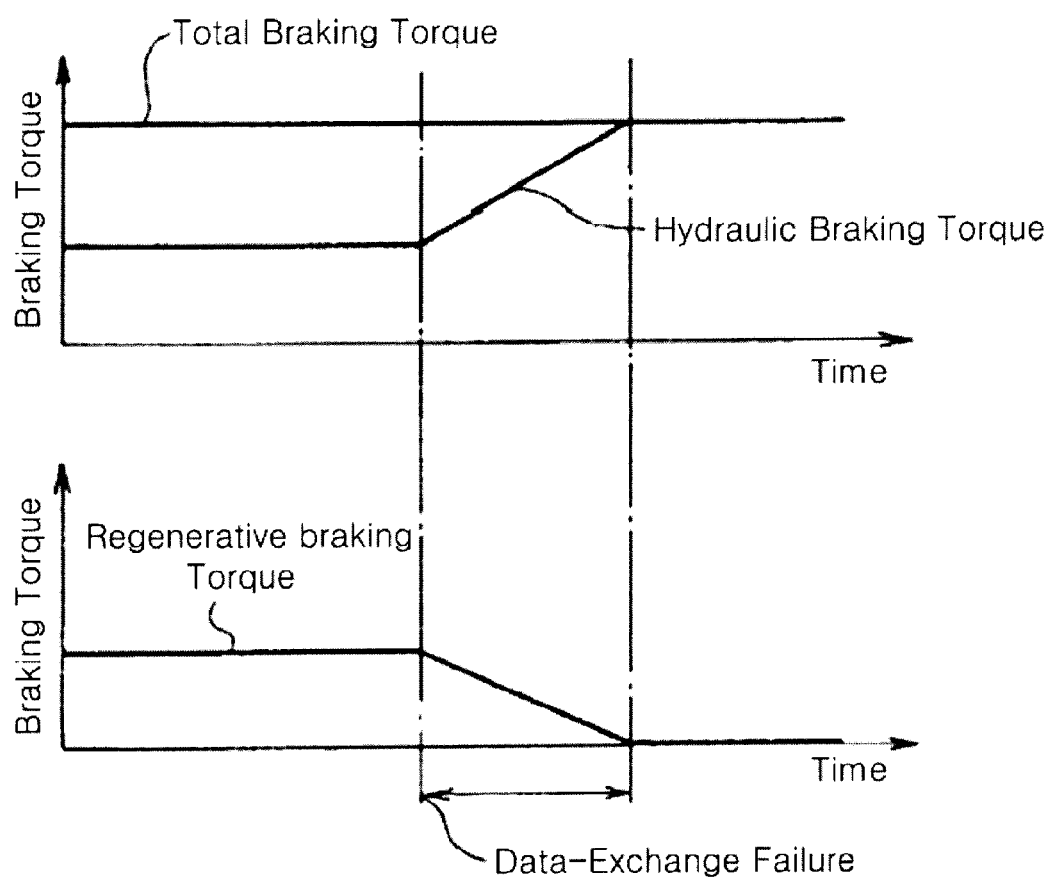
FIG. 7 shows a graph illustrating that the regenerative braking torque gradually decreases and the hydraulic pressure braking torque gradually increases until braking ends when the data communication fails between the two braking controllers in the conventional electric vehicle.

That is, the regenerative braking torque controller and the hydraulic pressure braking torque controller enable regenerative braking torque and hydraulic pressure braking torque, respectively, to be maintained at their respective initial level 30 and 31, thus being capable of maintaining the total braking torque at the previous level 32. That is, the total braking torque does not suffer from a loss of the previous total braking torque, comparing to the loss of the total braking torque 62 which takes advantage of the general concept shown in FIG. 5. This second embodiment of present invention prevents the braking force from being reduced, and thus enables the driver to feel a normal braking force when the driver steps on the brake pedal.

Braking ending means a state that the vehicle comes to a stop, or a state that the driver stops pushing down on the brake pedal.

Figure 4:
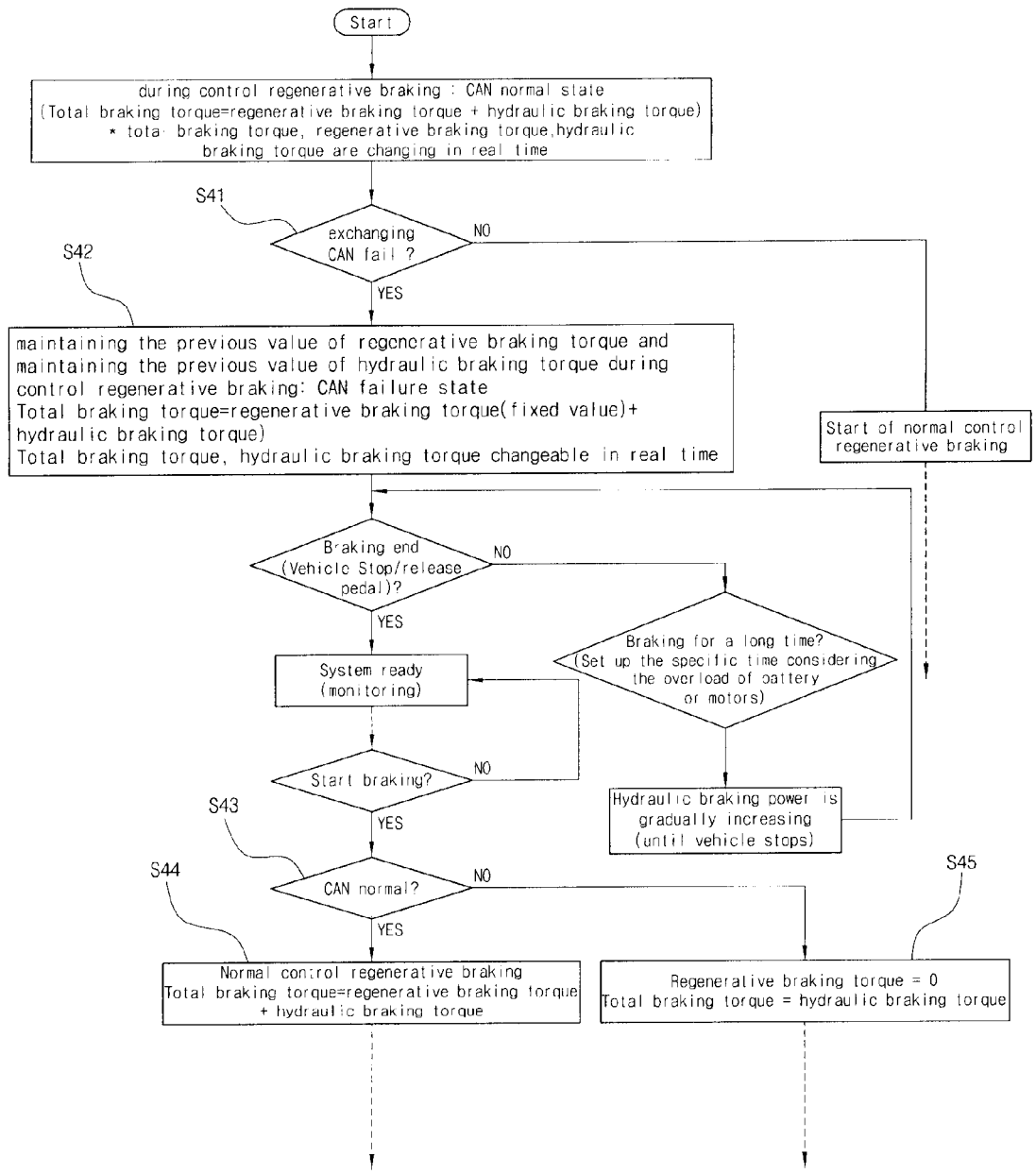
FIG. 4 shows a flow chart illustrating steps for controlling regenerative braking in an electric vehicle according to the second embodiment of the present invention.

FIG. 4 shows a flow chart illustrating steps for controlling regenerative braking in an electric vehicle according to the second embodiment of the present invention of FIG. 3.

From this flow chart a process of checking whether a data communication using a control area network (CAN) standard is properly made between a regenerative braking torque controller and a hydraulic pressure braking torque controller is shown at the step of S41. The step S42 shows a stage enabling the regenerative braking torque controller and the hydraulic pressure braking torque controller to maintain regenerative braking torque and hydraulic pressure torque, respectively, at their respective previous levels until braking ends, while the data communication fails between the regenerative braking torque controller and the hydraulic pressure braking torque controller.

After braking ends, step S43 checks whether CAN is normal. If the data communication is normal between the regenerative braking torque controller and the hydraulic pressure braking torque controller, regenerative braking is enabled again as shown at step S44. However if after braking ends, it is determined that CAN is not normal, only hydraulic pressure braking torque is involved in braking, with the regenerative braking torque not involved in braking at step of S45. That is, the regenerative braking torque controller does not allow the regenerative braking torque to be involved in braking.

Furthermore, the hydraulic pressure torque controller may increase the hydraulic pressure torque unit when the electric vehicle comes to a stop but electricity generated by the electric motor cannot be stored in excess of a capacity of the battery.

In brief, gradual increase in the regenerative braking torque as disclosed in the first embodiment, or maintenance of the regenerative braking torque at the previous level as disclosed in the second embodiment, while the data communication fails between the two controllers, still make the electric motor generate electricity by converting dynamic energy into electricity effectively and provide a constant feel of braking to the driver during braking action operation. Furthermore, it is made possible to shorten the time that it takes for the electric vehicle to come to stop and a distance that the electric vehicle travels during braking action operation.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for controlling regenerative braking in an electric vehicle, comprising:
   operating regenerative braking;
   checking if a data communication is properly made between a regenerative braking torque controller and a hydraulic pressure braking torque controller; and
   enabling the regenerative braking torque controller and the hydraulic pressure braking torque controller to gradually increase regenerative braking torque while maintaining hydraulic pressure braking torque or to gradually increase the hydraulic pressure braking torque while maintaining the regenerative braking torque, until braking ends, while the data communication fails between the regenerative braking torque controller and the hydraulic pressure braking torque controller.

2. A method for controlling regenerative braking in an electric vehicle, comprising:
   operating regenerative braking;
   checking if a data communication is properly made between a regenerative braking torque controller and a hydraulic pressure braking torque controller; and
   enabling the regenerative braking torque controller and the hydraulic pressure braking torque controller to gradually increase regenerative braking torque and hydraulic pressure braking torque, until braking ends, while the data communication fails between the regenerative braking torque controller and the hydraulic pressure braking torque controller.

3. The method for controlling regenerative braking in the electric vehicle according to claim 1 or 2,
   wherein the braking ends when the electric vehicle comes to a stop or when a driver stops pushing down on a brake pedal; and
   wherein the regenerative braking torque controller disables the regenerative braking torque to prevent the regenerative braking torque from being involved in braking after the braking ends and while the data communication fails between the regenerative braking torque controller and the hydraulic pressure braking torque controller.

* * * * *